US012021563B2

(12) United States Patent
Kang et al.

(10) Patent No.: US 12,021,563 B2
(45) Date of Patent: Jun. 25, 2024

(54) HIGHLY-INTEGRATED MULTI-CHANNEL OPTICAL MODULE HAVING LENS MOUNTING STRUCTURE FOR MINIMIZING OPTICAL ALIGNMENT ERROR AND LENS ASSEMBLY PROCESS THEREOF

(71) Applicant: ELECTRONICS AND TELECOMMUNICATIONS RESEARCH INSTITUTE, Daejeon (KR)

(72) Inventors: Hae Chung Kang, Daejeon (KR); Eun Kyu Kang, Daejeon (KR); Jong Jin Lee, Daejeon (KR); Sang Jin Kwon, Daejeon (KR); Won Bae Kwon, Daejeon (KR); Dae Seon Kim, Daejeon (KR); Dae Woong Moon, Daejeon (KR); Soo Yong Jung, Daejeon (KR); Gye Sul Cho, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 52 days.

(21) Appl. No.: 17/851,148

(22) Filed: Jun. 28, 2022

(65) Prior Publication Data
US 2023/0067645 A1 Mar. 2, 2023

(30) Foreign Application Priority Data

Aug. 25, 2021 (KR) .......................... 10-2021-0112258
Nov. 10, 2021 (KR) .......................... 10-2021-0154179

(51) Int. Cl.
*H04B 10/50* (2013.01)
*G02B 6/32* (2006.01)
(Continued)

(52) U.S. Cl.
CPC .......... *H04B 10/5053* (2013.01); *G02B 6/32* (2013.01); *G02B 6/4206* (2013.01);
(Continued)

(58) Field of Classification Search
CPC .... H04B 10/5053; H04B 10/25; H04B 10/50; H04B 10/503; G02B 6/32; G02B 6/4206;
(Continued)

(56) References Cited

U.S. PATENT DOCUMENTS 8,059,148 B2 * 11/2011 Kato ................ G03G 15/04036
347/257
8,414,730 B2 * 4/2013 Matsuura ................ F21V 17/10
362/257
(Continued)

FOREIGN PATENT DOCUMENTS

KR 10-2146989 B1 8/2020

*Primary Examiner* — Dibson J Sanchez
(74) *Attorney, Agent, or Firm* — LRK PATENT LAW FIRM

(57) ABSTRACT

A highly integrated multi-channel optical module is provided. The optical module includes an optical source device mounted on a substrate by an optical source mount unit, a waveguide mounted on the substrate by a waveguide mount unit, a lens mount unit disposed between the optical source device and the waveguide and mounted on the substrate, and a lens unit fixed to the lens mount unit by an adhesive cured by ultraviolet (UV) parallel light, wherein a light path of the UV parallel light is formed in the lens mount unit by a reflector attached on a side surface of the lens mount unit, and the UV parallel light moves along the light path and cures the adhesive coated on an upper portion of the lens mount unit facing a lower end portion of the lens unit.

10 Claims, 6 Drawing Sheets

(51) Int. Cl.
  *G02B 6/42* (2006.01)
  *H04B 10/25* (2013.01)
(52) U.S. Cl.
  CPC .......... *G02B 6/4212* (2013.01); *G02B 6/4239* (2013.01); *H04B 10/25* (2013.01); *H04B 10/50* (2013.01); *H04B 10/503* (2013.01)
(58) Field of Classification Search
  CPC .. G02B 6/4212; G02B 6/4228; G02B 6/4214; G02B 6/4239; G02B 6/43
  USPC .................................. 398/140–172, 182–201
  See application file for complete search history.

(56) References Cited

U.S. PATENT DOCUMENTS

| | | | | |
|---|---|---|---|---|
| 8,451,523 | B2 * | 5/2013 | Mihara | G02B 26/12 359/215.1 |
| 10,444,448 | B2 | 10/2019 | Jung et al. | |
| 10,795,087 | B2 | 10/2020 | Kim et al. | |
| 2002/0006041 | A1 * | 1/2002 | Naoe | B41J 2/471 362/455 |
| 2006/0222042 | A1 * | 10/2006 | Teramura | G02B 27/0961 372/101 |
| 2008/0049807 | A1 * | 2/2008 | Fujino | G02B 7/025 372/50.23 |
| 2013/0229714 | A1 * | 9/2013 | Kubota | B05D 3/067 359/601 |
| 2015/0370015 | A1 * | 12/2015 | Aoki | G02B 6/423 385/14 |
| 2016/0062061 | A1 | 3/2016 | Park et al. | |
| 2017/0017051 | A1 * | 1/2017 | Kaneko | G02B 6/32 |
| 2017/0242208 | A1 * | 8/2017 | Lee | G02B 6/424 |
| 2019/0041590 | A1 * | 2/2019 | Jung | G02B 6/4245 |
| 2020/0363597 | A1 * | 11/2020 | He | G02B 6/4239 |
| 2020/0400913 | A1 * | 12/2020 | Mochizuki | H04B 10/50 |
| 2022/0011528 | A1 * | 1/2022 | Fujimura | G02B 6/4206 |

\* cited by examiner

LENS MOUNT INCLUDING
LIGHT-TRANSMITTING MATERIAL

HIGHLY-INTEGRATED MULTI-CHANNEL OPTICAL MODULE HAVING LENS MOUNTING STRUCTURE FOR MINIMIZING OPTICAL ALIGNMENT ERROR AND LENS ASSEMBLY PROCESS THEREOF

CROSS-REFERENCE TO RELATED APPLICATIONS

This application claims the benefit of the Korean Patent Application Nos. 10-2021-0112258 filed on Aug. 25, 2021 and 10-2021-0154179 filed on Nov. 10, 2021, which are hereby incorporated by reference as if fully set forth herein.

BACKGROUND

1. Field of the Invention

The present invention relates to technology applicable to mounting of an optical lens of an optical communicator (an optical transmitter and an optical receiver) including an optical communication multi-channel optical device (an optical source device and an optical reception device) and an optical waveguide device (an optical coupler and an optical distributor device), and particularly, to technology of a highly-integrated optical module structure which enables a lens to be efficiently mounted despite a narrow channel interval, in optical alignment between a multi-channel optical source and a multi-channel waveguide.

2. Description of Related Art

Recently, as industries of data center and artificial intelligence (AI) advance rapidly and it is required to transmit and receive more data for a shorter time, the miniaturization, high integration, and high speed of optical transceiver modules are needed.

The optical transceiver modules include an optical sub assembly (OSA) unit which converts an optical signal into an electrical signal or converts an electrical signal into an optical signal and an electrical sub assembly (ESA) unit which performs signal processing on an electrical signal.

The OSA unit includes a transmitter optical sub assembly (TOSA) which transmits an optical signal obtained by converting an electrical signal into an optical signal and a receiver optical sub assembly (ROSA) which converts a received optical signal into an electrical signal.

Optical devices such as a laser diode (LD), a photodiode (PD), a mirror, a lens, and a waveguide and the precise optical alignment of optical devices are needed for securing maximum optical coupling efficiency in manufacturing essential optical element such as the TOSA and the ROSA.

Particularly, light devices and optical devices should be aligned within an error of several m, in order to transmit and receive an optical signal through a waveguide device, including a core of 9 μm or less, such as a planar waveguide circuit (PLC) type optical wavelength multiplexer based on high refraction silica such as a single mode fiber (SMF) and an arrayed waveguide (AWG) for long-distance transmission.

Moreover, as multisource agreement (MSA) standard of quad small form-factor pluggable (QSFP-DD) standard of 400 to 800 Gbps and 1.6 Tbps optical transceivers is completed recently, the requirements for integrating multi-channel light devices and optical devices, having four to eight channels and sixteen channels, in a space where 100 Gbps and 200 Gbps per channel are limited to a basic speed are increasing. Therefore, securing the precision of optical alignment and a bonding process and shortening an optical alignment process time per channel are increasingly becoming an important issue for enhancing productivity.

In a process of manufacturing a general TOSA used conventionally, for optical alignment of an LD and a waveguide, as in FIG. 1, a lens 10 is inserted between a waveguide 20 and an LD 30, and then, the intensity of light incident on the waveguide 20 based on 3-axis direction positions of X-Y-Z are measured and the lens 10 moves to a position at which a measurement value is the maximum. Subsequently, epoxy 50 is injected between a lower end portion of the lens 10 and an optical module platform substrate 40, and then, the epoxy 50 is cured with light of thermal or ultraviolet wavelength band to fix the lens 10.

Such a lens fixing method coats photo-curable epoxy, reacting on light having a specific wavelength, on a bonding portion and irradiates a beam of an ultraviolet (UV) laser 60 from the outside to cure the epoxy 50. Such an epoxy curing process is characterized in that epoxy is changed from an initial liquid state to a gel state which is a semisolid state, on the basis of light of an ultraviolet (UV) band and is cured in a solid state.

In such a curing process, a state change of the epoxy 50 depends on a hardener reaction in the epoxy 50, and in this process, a contraction process of decreasing a volume of the epoxy 50 is performed, whereby an optical alignment error caused by a position change of an optical system occurs in a process of curing the epoxy 50.

In other words, an optical alignment error occurring in a process of curing the epoxy 50 depends on a curing characteristic of the epoxy 50 and is very sensitive to a case where the amount of exposed light based on an optical module structure such as a light irradiation area and a light irradiation angle is non-uniformly distributed to a region on which epoxy is coated, causing an additional optical alignment error which occurs in a natural curing operation due to heat applied from the outside after a curing operation.

A holder such as a lens gripper grips a lens with a sufficient force, in order to place a lens position at an optical alignment point despite a contraction force occurring in curing the epoxy 50 in a conventional lens assembly process as in FIG. 1.

Subsequently, light of a UV wavelength band is irradiated onto an epoxy region under the lens 10 for each channel so as to cure the epoxy, and in this case, the UV laser 60 having a general UV wavelength is used. In this case, the UV laser 60 uses a method of irradiating a beam at an upper end of an optical module as in FIG. 1.

However, due to interference caused by a structure material such as a lens, gripper, and a waveguide in a very narrow space up to an epoxy coating region, it is difficult to irradiate a beam of the UV laser 60 onto the epoxy 50 and it is difficult to secure a symmetrical epoxy curing characteristic with respect to a lens, and due to this, an optical alignment error occurs due to the non-uniformity of a contraction force occurring in a process of curing the epoxy.

SUMMARY

An aspect of the present invention is directed to providing a highly-integrated multi-channel optical module having a lens mounting structure, in which an optical alignment error caused by non-uniformity of a contraction force in curing epoxy is minimized by uniformly irradiating an epoxy-curable UV laser for each channel under the same condition in a multi-channel optical module platform.

To achieve these and other advantages and in accordance with the purpose of the invention, as embodied and broadly described herein, there is provided a highly integrated multi-channel optical module including: an optical source device mounted on a substrate by an optical source mount unit; a waveguide mounted on the substrate by a waveguide mount unit; a lens mount unit disposed between the optical source device and the waveguide and mounted on the substrate; and a lens unit fixed to the lens mount unit by an adhesive cured by ultraviolet (UV) parallel light, wherein a light path of the UV parallel light is formed in the lens mount unit by a reflector attached on a side surface of the lens mount unit, and the UV parallel light moves along the light path and cures the adhesive coated on an upper portion of the lens mount unit facing a lower end portion of the lens unit.

In an embodiment, the lens mount unit may include a transparent material for forming the light path.

In an embodiment, a side surface of the lens mount unit may be a side surface inclined by a certain angle.

In an embodiment, the certain angle may be determined based on a thickness of the lens mount unit and a position of the lens unit fixed to an upper surface of the lens mount unit.

In an embodiment, the lens mount unit may include: a tetragonal-shape upper surface having a first area; a tetragonal-shape lower surface having a second area which is less than the first area; and four side surfaces provided between the upper surface and the lower surface, and the reflector may be attached on each of two side surfaces, which are inclined by a certain angle and face each other, of the four side surfaces.

In an embodiment, the reflector may include a first reflector and a second reflector, the first reflector may be attached on one side surface of side surfaces of the lens mount unit, and the second reflector may be attached on a side surface, facing the one side surface, of the side surfaces of the lens mount unit.

In an embodiment, the UV parallel light incident on an inner portion of the lens mount unit may be reflected by the first reflector, and the UV parallel light reflected by the first reflector may be reflected by the second reflector to cure the adhesive coated on the upper portion of the lens mount unit facing the lower end portion of the lens unit.

In another aspect of the present invention, there is provided a lens assembly process of a highly integrated multi-channel optical module including: mounting an optical source device on a substrate by using an optical source mount unit and mounting a waveguide on the substrate by using a waveguide mount unit; mounting a lens mount unit on the substrate between the optical source mount unit and the waveguide mount unit; inserting a lens unit into a space between the optical source mount unit and the waveguide mount unit by using a lens gripper; coating an epoxy adhesive on a region between a lower end portion of the lens unit and an upper surface of the lens mount unit; and irradiating ultraviolet (UV) parallel light onto the upper surface of the lens mount unit, wherein the irradiating the UV parallel light includes moving the UV parallel light along a light path formed by a reflector attached on a side surface of the lens mount unit to cure the epoxy adhesive.

In an embodiment, the irradiating the UV parallel light may include: reflecting the UV parallel light by using a first reflector attached on one inclined side surface of side surfaces of the lens mount unit; reflecting the UV parallel light reflected by the first reflector by using another inclined side surface facing the one inclined side surface among the side surfaces of the lens mount unit and moving the reflected UV parallel light in an upward direction of the lens mount unit; and curing the epoxy adhesive coated between the lower end portion of the lens unit and the upper surface of the lens mount unit by using the UV parallel light which has moved in the upward direction of the lens mount unit.

In an embodiment, the irradiating the UV parallel light may include irradiating the UV parallel light onto the upper surface of the lens mount unit including a transparent material.

In an embodiment, the irradiating the UV parallel light may include irradiating the UV parallel light onto one end surface of the upper surface of the lens mount unit.

In an embodiment, the inserting the lens unit into a space between the optical source mount unit and the waveguide mount unit may include inserting the lens unit into a space in the one end surface of the upper surface of the lens mount unit.

It is to be understood that both the foregoing general description and the following detailed description of the present invention are exemplary and explanatory and are intended to provide further explanation of the invention as claimed.

DETAILED DESCRIPTION OF THE INVENTION

In embodiments of the present invention disclosed in the detailed description, specific structural or functional descriptions are merely made for the purpose of describing embodiments of the present invention. Embodiments of the present invention may be embodied in various forms, and the present invention should not be construed as being limited to embodiments of the present invention disclosed in the detailed description.

In the following description, the technical terms are used only for explain a specific exemplary embodiment while not limiting the present invention. The terms of a singular form may include plural forms unless referred to the contrary. The meaning of 'comprise', 'include', or 'have' specifies a property, a region, a fixed number, a step, a process, an element and/or a component but does not exclude other properties, regions, fixed numbers, steps, processes, elements and/or components.

Figure 1:
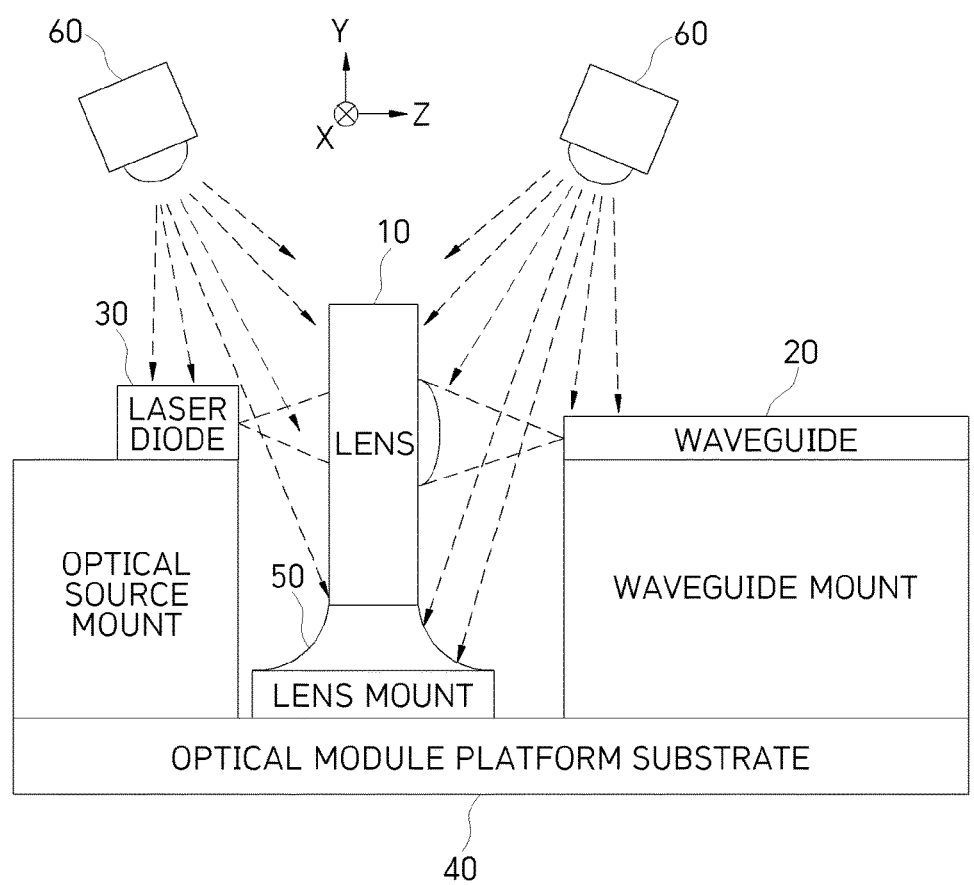
FIG. 1 is a diagram for describing an optical alignment error occurring in a lens assembly process in performing a process of manufacturing a general transmitter optical sub assembly (TOSA).
Figure 2:
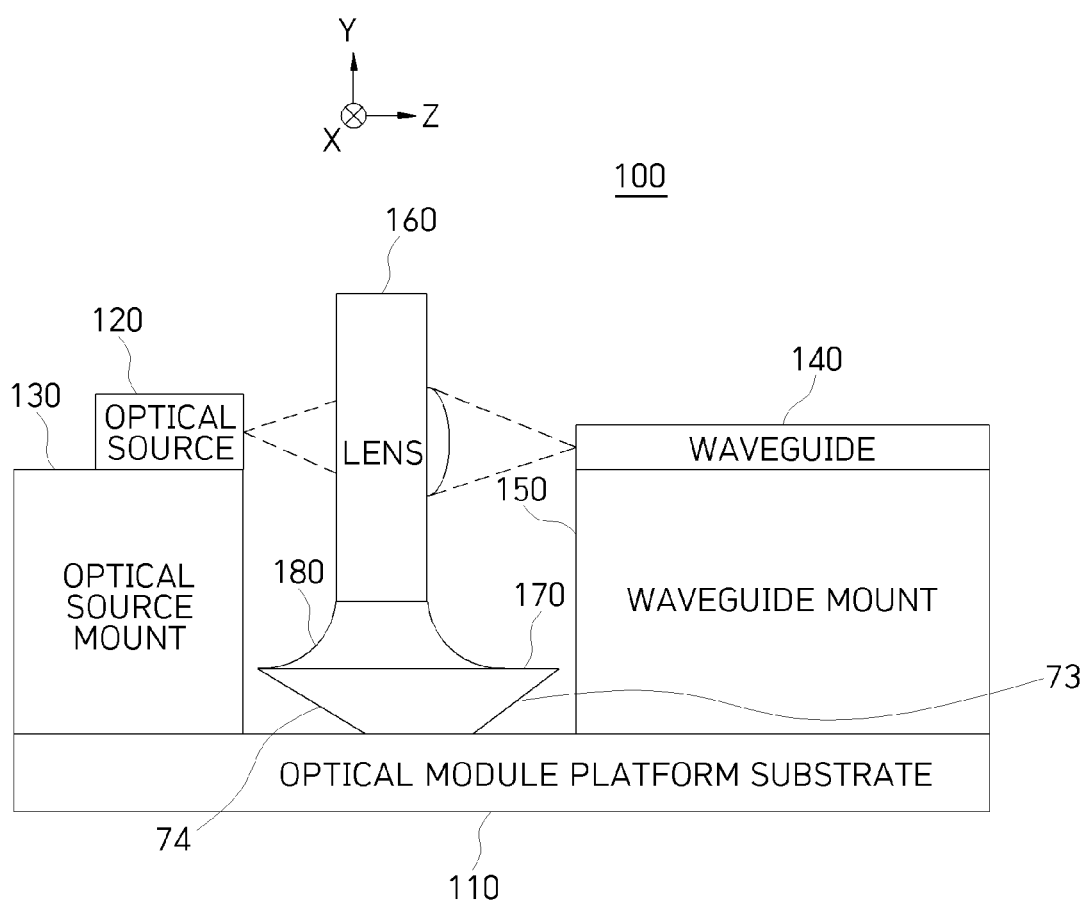
FIG. 2 is a diagram for describing a structure of a highly integrated multi-channel optical module according to an embodiment of the present invention.

FIG. 2 is a diagram for describing a structure of a highly integrated multi-channel optical module according to an embodiment of the present invention.

Referring to FIG. 2, the highly integrated multi-channel optical module according to an embodiment of the present invention may include an optical module platform substrate 110 (hereinafter referred to as a substrate), an optical source device 130, an optical source mount unit 130, a waveguide 140, a waveguide mount unit 150, a multi-channel lens unit 160, and a lens mount unit 170.

The optical source device 130 may be mounted on the substrate 110 by using an optical source mount unit 120.

The waveguide 140 may be mounted on the substrate 110 by using the waveguide mount unit 150.

The multi-channel lens 160 may be mounted on the substrate 110 by using the lens mount unit 170.

Features of the present invention may not be associated with the optical source mount unit 120 and the waveguide mount unit 150, and thus, detailed descriptions of a shape, a material, and a structure of the optical source mount unit 120 and the waveguide mount unit 150 are omitted.

The waveguide 140 disposed on the optical source device 120 and the waveguide mount unit 150 disposed on the optical source mount unit 130 may be disposed in a virtual straight line extending in a light output direction (a Z-axis direction) of the optical source device 120.

The multi-channel lens unit 160 which irradiates light, emitted from the optical source device 120, onto the waveguide 140 may be disposed between the optical source device 120 and the waveguide 140 and the multi-channel lens 160 may be mounted on the substrate 110 by the lens mount unit 170, and thus, the lens mount unit 170 may also be disposed between the optical source device 120 and the waveguide 140.

The multi-channel lens 160 may be fixed to the lens mount unit 170 by an adhesive 180. The adhesive 180 may be, for example, an epoxy-based hardener.

The lens mount unit 170 may include a transparent material such as glass or sapphire so that an epoxy-curable laser of an UV wavelength band is transmitted to an inner portion thereof, and a plurality of reflectors 73 and 74 may be provided on side surfaces of the lens mount unit 170.

The reflectors 73 and 74 provided on side surfaces of the lens mount unit 170 may convert a light path of epoxy-curable UV parallel light so that epoxy-curable UV parallel light transmitted to an inner portion of the lens mount unit 170 is accurately irradiated onto the adhesive 180 (epoxy) coated between a lower end portion of the multi-channel lens 160 and an upper surface of the lens mount unit 170 facing each other.

Moreover, after an epoxy curing process, the reflectors 73 and 74 may provide a function of determining the occurrence or not of a defect such as an air bubble or a crack in an epoxy curing region, on the basis of a vision test.

Figure 3:
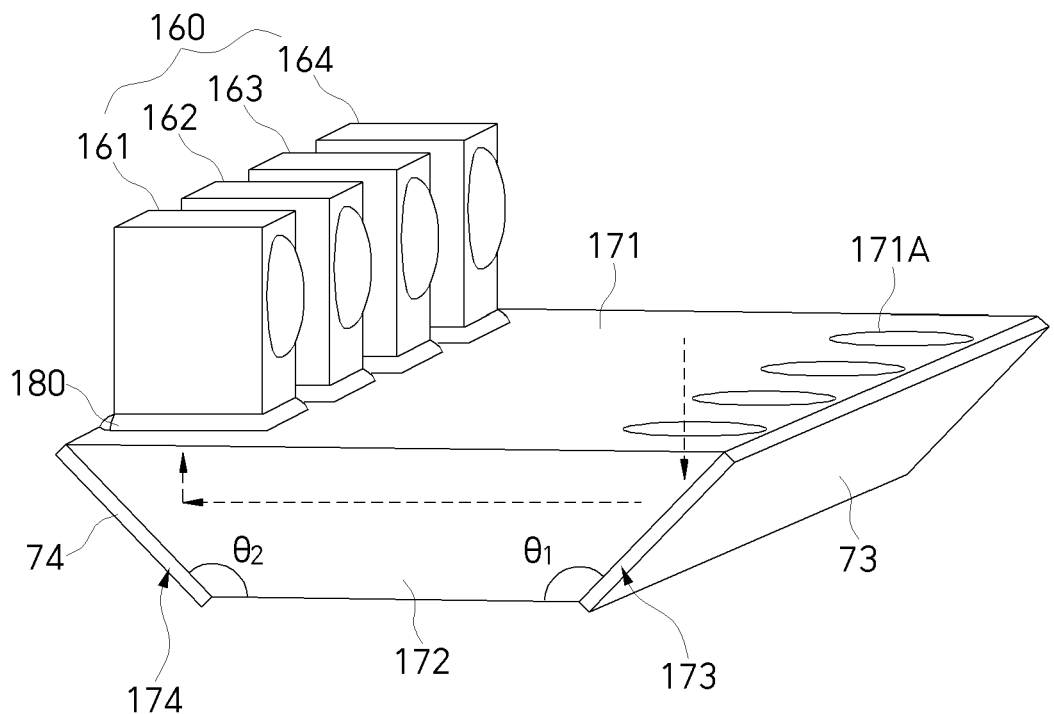
FIG. 3 is a diagram for describing a detailed structure according to an embodiment of a lens mount unit illustrated in FIG. 2.

FIG. 3 is a diagram for describing a detailed structure according to an embodiment of the lens mount unit 170 illustrated in FIG. 2.

Referring to FIG. 3, a lens mount unit 170 according to an embodiment of the present invention may include a tetragonal-shape upper surface 171 having a first area, a tetragonal-shape lower surface 172 having a second area which is less than the first area, and four side surfaces connecting the upper surface 171 to the lower surface 172.

Two side surfaces 173 and 174 facing each other among the four side surfaces may be configured as surfaces inclined by certain angles θ1 and θ2, and the reflectors (or reflection films) 73 and 74 may be respectively attached on the inclined side surfaces 173 and 174. The inclined angles θ1 and θ2 of the inclined side surfaces 173 and 174 of the lens mount unit 170 may be determined based on a thickness of the lens mount unit 170 and a position of the multi-channel lens unit 160.

The lens mount unit 170 having such a shape structure may include a transparent material such as glass or sapphire so that UV parallel light emitted from a curable optical source is transmitted to an inner portion thereof.

The UV parallel light, as illustrated in FIG. 3, may be transmitted to the inner portion of the lens mount unit 170 through one partial surface 171A of the upper surface 171 of the lens mount unit 170.

The UV parallel light transmitted to the inner portion of the lens mount unit 170 through the one partial surface 171A may be reflected by the reflector 73 attached on the inclined side surface 173 adjacent to the one partial surface 171A and may move to the reflector 74 attached on the inclined side surface 174 opposite thereto.

Subsequently, the UV parallel light moving to the reflector 74 may be reflected by the reflector 74 and may move in an upward direction. In this case, the multi-channel lens unit 160 (161 to 164) may be designed to be fixed to the other partial surface of the upper surface 171 of the lens mount unit 170 by using the adhesive 180, and thus, the UV parallel light which is reflected by the reflector 74 and moves in the upward direction may be accurately and intensively irradiated onto a front surface on which the adhesive 180 is coated.

The inclined angles θ1 and θ2 of the inclined side surfaces 173 and 174 of the lens mount unit 170 may be determined based on a thickness of the lens mount unit 170 and a position of the lens.

Figure 4:
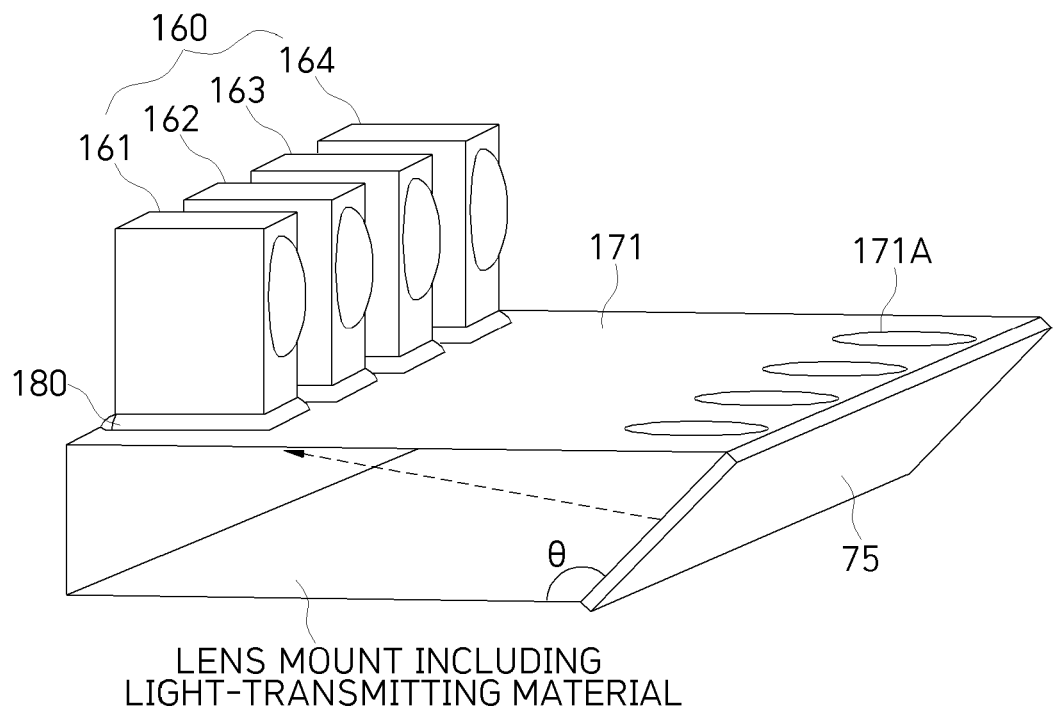
FIG. 4 is a diagram for describing a detailed structure according to another embodiment of the lens mount unit illustrated in FIG. 2.

FIG. 4 is a diagram for describing a detailed structure according to another embodiment of the lens mount unit 170 illustrated in FIG. 2.

Referring to FIG. 4, a lens mount unit 170 according to another embodiment of the present invention may be configured with a side surface 75 where only one side surface is inclined and may be configured to include only one reflector 75 attached on the one inclined side surface, and thus, may have a difference with the above-described embodiment of FIG. 3 which is configured to include the two reflectors 73 and 74 respectively attached on the two inclined side surfaces 173 and 174 facing each other.

Figure 5:
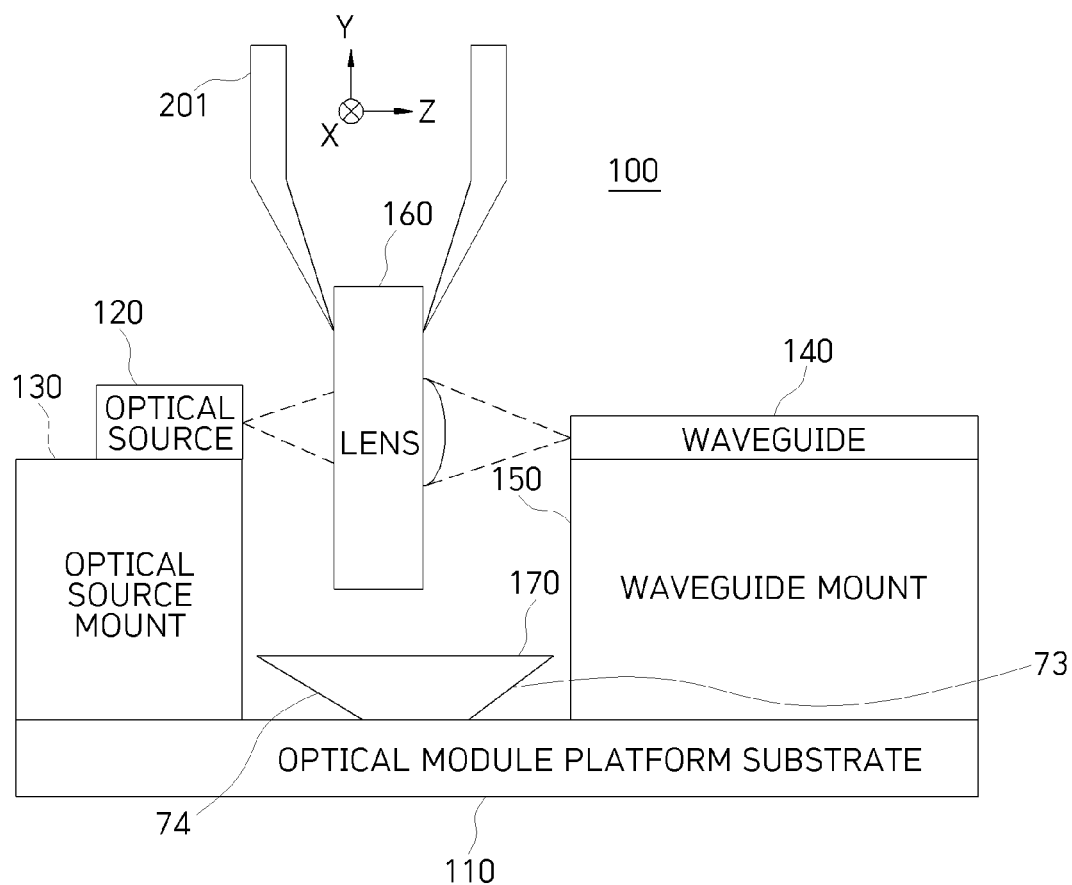
FIGS. 5 to 7 are diagrams for describing a lens assembly process of a highly integrated multi-channel optical module according to an embodiment of the present invention.
Figure 6:
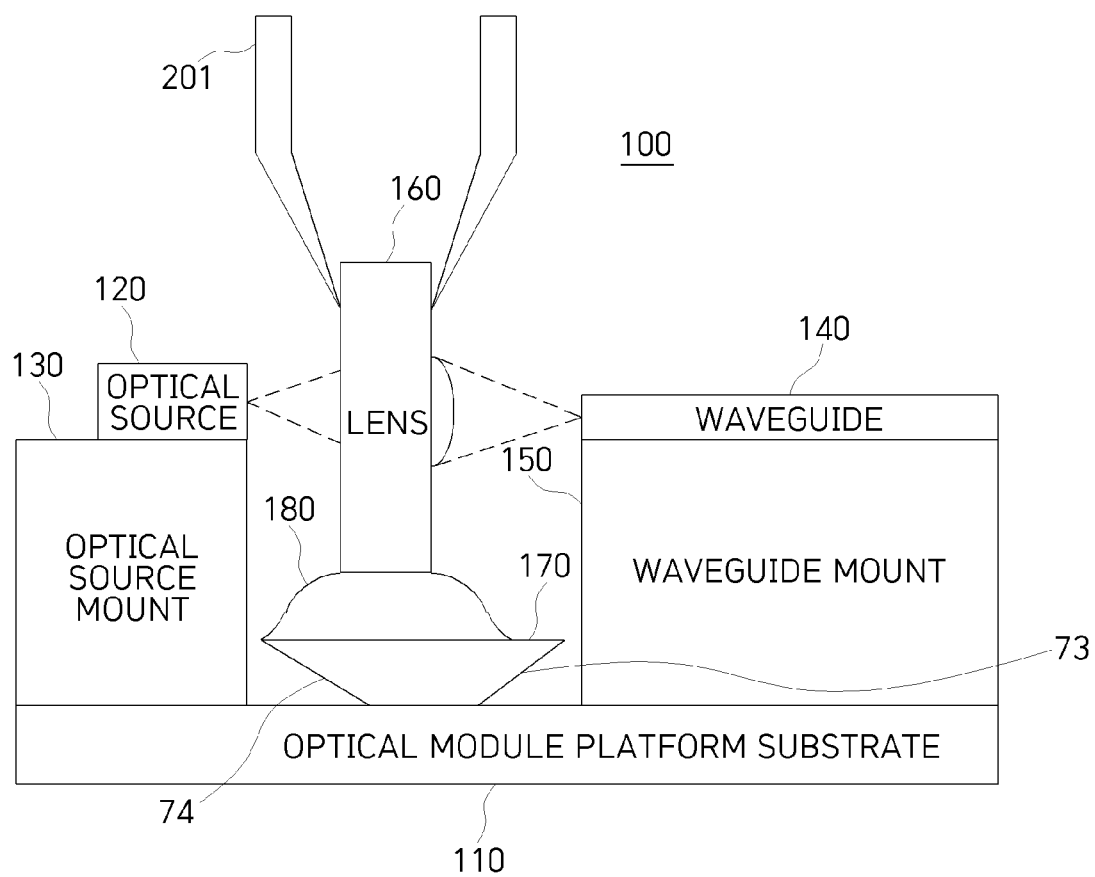
Figure 7:
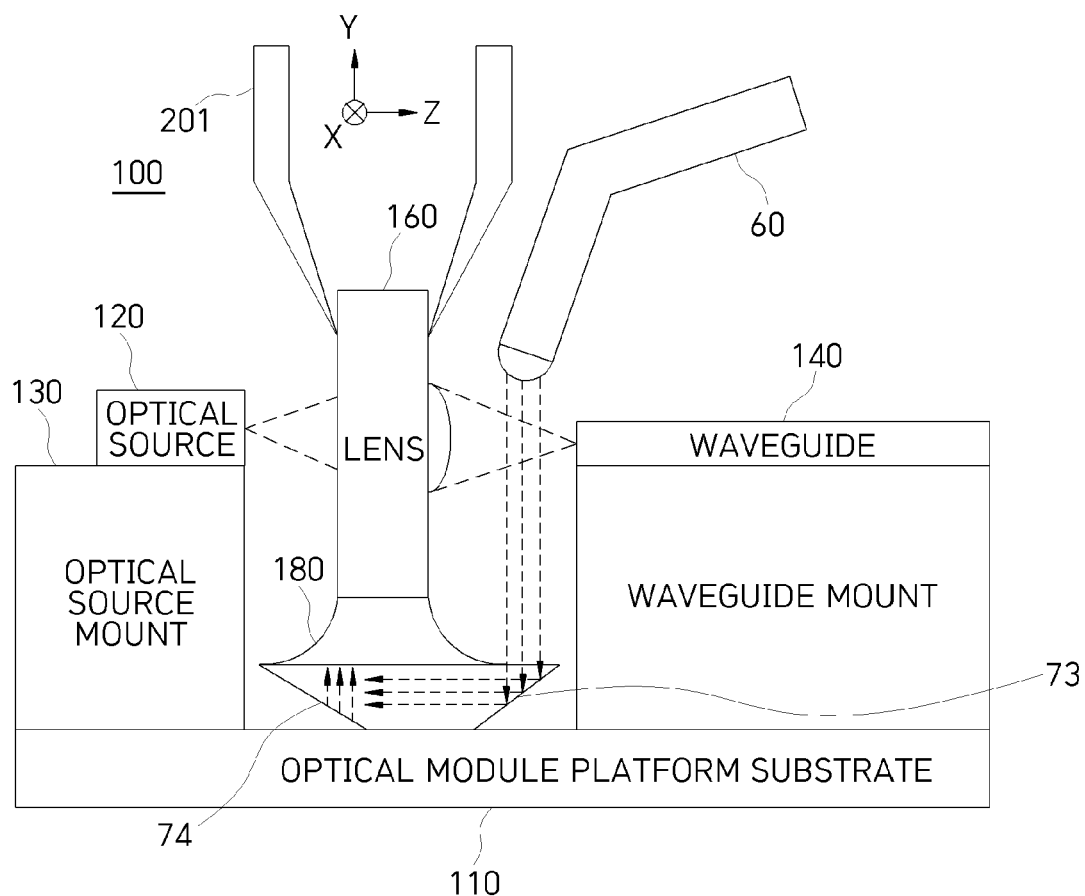

FIGS. 5 to 7 are diagrams for describing a lens assembly process of a highly integrated multi-channel optical module according to an embodiment of the present invention.

Referring to FIG. 5, a lens alignment process may be performed.

First, a substrate 110 may be prepared.

Subsequently, an optical source device 120 may be mounted on the substrate 110 by using an optical source mount unit 120, and a waveguide 140 may be mounted on the substrate 110 by using a waveguide mount unit 150.

Subsequently, a lens mount unit 170 may be mounted on the substrate 110 between the optical source mount unit 120 and the waveguide mount unit 150.

On the other hand, the lens mount unit 170 may be first mounted on the substrate 110, and then, the optical source mount unit 120 and the waveguide mount unit 150 may be mounted on the substrate 110 with the lens mount unit 170 therebetween.

Subsequently, a lens unit 160 may be inserted into a space between the optical source mount unit 120 and the waveguide mount unit 150 in a state where a lens gripper 201 grips the lens unit 160 with a sufficient force.

Subsequently, while the lens gripper 201 is moving the lens unit 160 in a 3-axis direction (an X-axis direction, a Y-axis direction, and a Z-axis direction), a position of the lens unit 160 may be aligned so that intensity of light which passes through the lens unit 160 and is incident on the waveguide 140 is the maximum.

Subsequently, referring to FIG. 6, when a lens alignment process is completed, an epoxy adhesive 180A having a liquid state may be coated between a lower end portion of the lens unit 160 and an upper surface of the lens mount unit 170 facing the lower end portion.

Subsequently, referring to FIG. 7, curable UV parallel light from a curable optical source 60 may be irradiated onto an upper surface 171 of the lens mount unit 170 in a Y-axis downward direction. In this case, a region (171A of FIG. 3), on which the UV parallel light is incident, of the upper surface 171 of the lens mount unit 170 may be a region adjacent to the inclined side surface 173.

The UV parallel light incident on an inner portion of the lens mount unit 170 through the region (171A of FIG. 3) may be reflected by a reflector 73 attached on the inclined side surface 173, reflected by a reflector 74 attached on an opposite inclined side surface 174 facing the inclined side surface 173, and irradiated onto the epoxy adhesive 180A having a liquid state coated on the lower end portion of the lens unit 160, and thus, the epoxy adhesive 180A may be cured and the lens unit 160 may be fixed to the lens mount unit 170 by the cured epoxy adhesive 180.

Subsequently, the same process as FIGS. 5 to 7 may be repeatedly performed on another lens unit of an adjacent channel.

As described above, in the present invention, the lens mount unit 170 may be implemented with a transparent material and the reflectors 73 and 74 may be attached on the inclined side surfaces 173 and 174 of the lens mount unit 170, and thus, a light path of the UV parallel light may be formed in the lens mount unit 170.

Such a light path may be formed in the lens mount unit 170 where there is no obstacle, and thus, the UV parallel light moving along the light path may be accurately and intensively irradiated onto the epoxy adhesive 180A having a liquid state coated between the lower end portion of the lens unit 170 and the upper surface 171 of the lens mount unit 170 without interference by an arbitrary obstacle, thereby minimizing an optical alignment error caused by the non-uniformity of a contraction force occurring in a process of curing the epoxy adhesive.

According to the embodiments of the present, by using a lens mount including a reflector, an optical alignment error caused by non-uniformity of an epoxy contraction force may be minimized by uniformly, accurately, and intensively irradiating an epoxy-curable UV laser (for example, a UV laser) in performing a lens alignment process on a multi-channel optical module, and thus, an epoxy curing time may be shortened, thereby enhancing a product production speed.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:
1. A highly integrated multi-channel optical module comprising:
   an optical source device mounted on a substrate by an optical source mount unit;
   a waveguide mounted on the substrate by a waveguide mount unit;
   a lens mount unit disposed between the optical source device and the waveguide and mounted on the substrate; and
   a lens unit fixed to the lens mount unit by an adhesive cured by ultraviolet (UV) parallel light,
   wherein a light path of the UV parallel light is formed in the lens mount unit by a reflector attached on a side surface of the lens mount unit, and the UV parallel light moves along the light path and cures the adhesive coated on an upper portion of the lens mount unit facing a lower end portion of the lens unit,
   wherein the lens mount unit comprises:
   a tetragonal-shape upper surface having a first area;
   a tetragonal-shape lower surface having a second area which is less than the first area; and
   four side surfaces provided between the upper surface and the lower surface, and
   the reflector is attached on each of two side surfaces, which are inclined by a certain angle and face each other, of the four side surfaces.

2. The highly integrated multi-channel optical module of claim 1, wherein the lens mount unit comprises a transparent material for forming the light path.

3. The highly integrated multi-channel optical module of claim 1, wherein a side surface of the lens mount unit is a side surface inclined by a certain angle.

4. The highly integrated multi-channel optical module of claim 3, wherein the certain angle is determined based on a thickness of the lens mount unit and a position of the lens unit fixed to an upper surface of the lens mount unit.

5. The highly integrated multi-channel optical module of claim 1, wherein the reflector comprises a first reflector and a second reflector,
   the first reflector is attached on one side surface of side surfaces of the lens mount unit, and
   the second reflector is attached on a side surface, facing the one side surface, of the side surfaces of the lens mount unit.

6. A highly integrated multi-channel optical module comprising:
   an optical source device mounted on a substrate by an optical source mount unit;
   a waveguide mounted on the substrate by a waveguide mount unit;
   a lens mount unit disposed between the optical source device and the waveguide and mounted on the substrate; and
   a lens unit fixed to the lens mount unit by an adhesive cured by ultraviolet (UV) parallel light,
   wherein a light path of the UV parallel light is formed in the lens mount unit by a reflector attached on a side surface of the lens mount unit, and the UV parallel light moves along the light path and cures the adhesive coated on an upper portion of the lens mount unit facing a lower end portion of the lens unit,
   wherein the reflector comprises a first reflector and a second reflector,
   the first reflector is attached on one side surface of side surfaces of the lens mount unit, and
   the second reflector is attached on a side surface, facing the one side surface, of the side surfaces of the lens mount unit,
   wherein the UV parallel light incident on an inner portion of the lens mount unit is reflected by the first reflector, and the UV parallel light reflected by the first reflector is reflected by the second reflector to cure the adhesive coated on the upper portion of the lens mount unit facing the lower end portion of the lens unit.

7. A lens assembly process of a highly integrated multi-channel optical module, the lens assembly process comprising:

mounting an optical source device on a substrate by using an optical source mount unit and mounting a waveguide on the substrate by using a waveguide mount unit;

mounting a lens mount unit on the substrate between the optical source mount unit and the waveguide mount unit;

inserting a lens unit into a space between the optical source mount unit and the waveguide mount unit by using a lens gripper;

coating an epoxy adhesive on a region between a lower end portion of the lens unit and an upper surface of the lens mount unit; and irradiating ultraviolet (UV) parallel light onto the upper surface of the lens mount unit, wherein the irradiating the UV parallel light comprises moving the UV parallel light along a light path formed by a reflector attached on a side surface of the lens mount unit to cure the epoxy adhesive, wherein the irradiating the UV parallel light comprises:

reflecting the UV parallel light by using a first reflector attached on one inclined side surface of side surfaces of the lens mount unit;

reflecting the UV parallel light reflected by the first reflector by using another inclined side surface facing the one inclined side surface among the side surfaces of the lens mount unit and moving the reflected UV parallel light in an upward direction of the lens mount unit; and curing the epoxy adhesive coated between the lower end portion of the lens unit and the upper surface of the lens mount unit by using the UV parallel light which has moved in the upward direction of the lens mount unit.

8. The lens assembly process of claim 7, wherein the irradiating the UV parallel light comprises irradiating the UV parallel light onto the upper surface of the lens mount unit including a transparent material.

9. The lens assembly process of claim 7, wherein the irradiating the UV parallel light comprises irradiating the UV parallel light onto one end surface of the upper surface of the lens mount unit.

10. The lens assembly process of claim 7, wherein the inserting the lens unit into a space between the optical source mount unit and the waveguide mount unit comprises inserting the lens unit into a space in one end surface of the upper surface of the lens mount unit.

\* \* \* \* \*